United States Patent [19]
Richardson, Jr. et al.

[11] Patent Number: 6,041,573
[45] Date of Patent: Mar. 28, 2000

[54] APPARATUS AND METHOD FOR CHARGING CANISTERS WITH A HIGH PRESSURE GAS

[75] Inventors: Ronald W. Richardson, Jr., Essexville; James Harrington, Bay City, both of Mich.

[73] Assignee: RWC, Inc., Bay City, Mich.

[21] Appl. No.: 08/969,940

[22] Filed: Nov. 25, 1997

Related U.S. Application Data

[62] Division of application No. 08/586,298, Jan. 16, 1996, Pat. No. 5,760,360.

[51] Int. Cl.⁷ .................................................. B65B 31/00
[52] U.S. Cl. .................................. 53/403; 53/404; 53/79; 53/80; 141/329
[58] Field of Search .............................. 141/329; 53/403, 53/404, 79, 80, 81, 83, 52, 53, 54; 219/50, 86.1, 91.2, 117.1

[56] References Cited

U.S. PATENT DOCUMENTS

| | | |
|---|---|---|
| 3,081,587 | 3/1963 | Hackethorn .............................. 53/404 |
| 4,025,371 | 5/1977 | Pecha ......................................... 53/53 |
| 4,451,964 | 6/1984 | Ludwig ..................................... 53/403 |
| 4,564,138 | 1/1986 | Bethell et al. ............................ 53/403 |
| 5,033,254 | 7/1991 | Zenger ...................................... 53/53 |
| 5,196,669 | 3/1993 | Richardson .............................. 53/403 |
| 5,352,860 | 10/1994 | Richardson .............................. 53/403 |
| 5,577,364 | 11/1996 | Wang et al. ............................... 53/53 |

*Primary Examiner*—James F. Coan
*Assistant Examiner*—Gene L. Kim
*Attorney, Agent, or Firm*—Lalos & Keegan

[57] ABSTRACT

An apparatus for charging a closed metallic canister with a gas under pressure comprising means for forming a gas filling opening in the canister, and dispensing means for sequentially injecting a high pressure gas through the gas filling opening to charge the canister, and depositing and fusing a fusible body in the gas filling opening, while continuing to inject gas into the canister and utilize the force of the gas to urge the dispensing means into sealing engagement with the canister being charged.

14 Claims, 11 Drawing Sheets

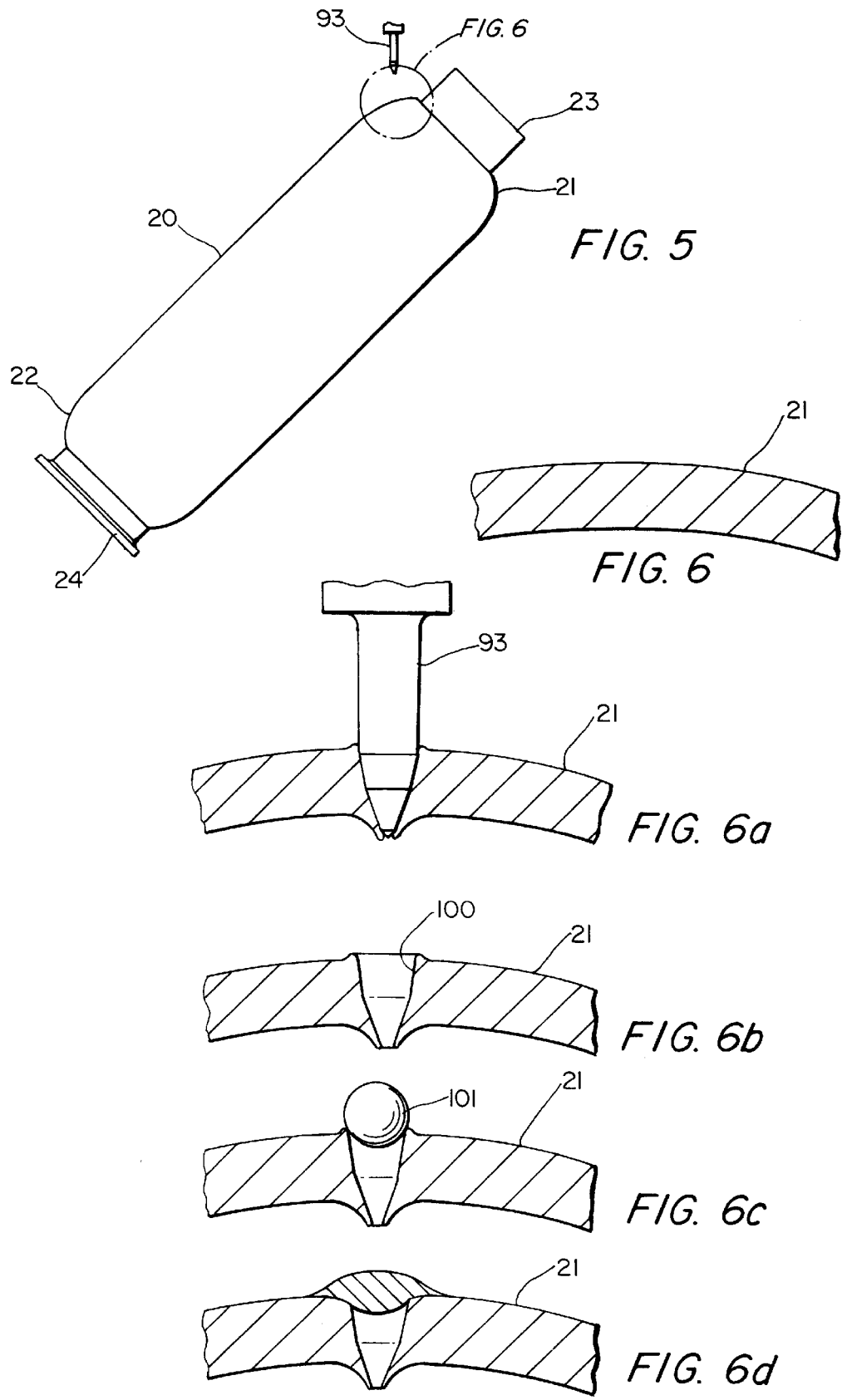

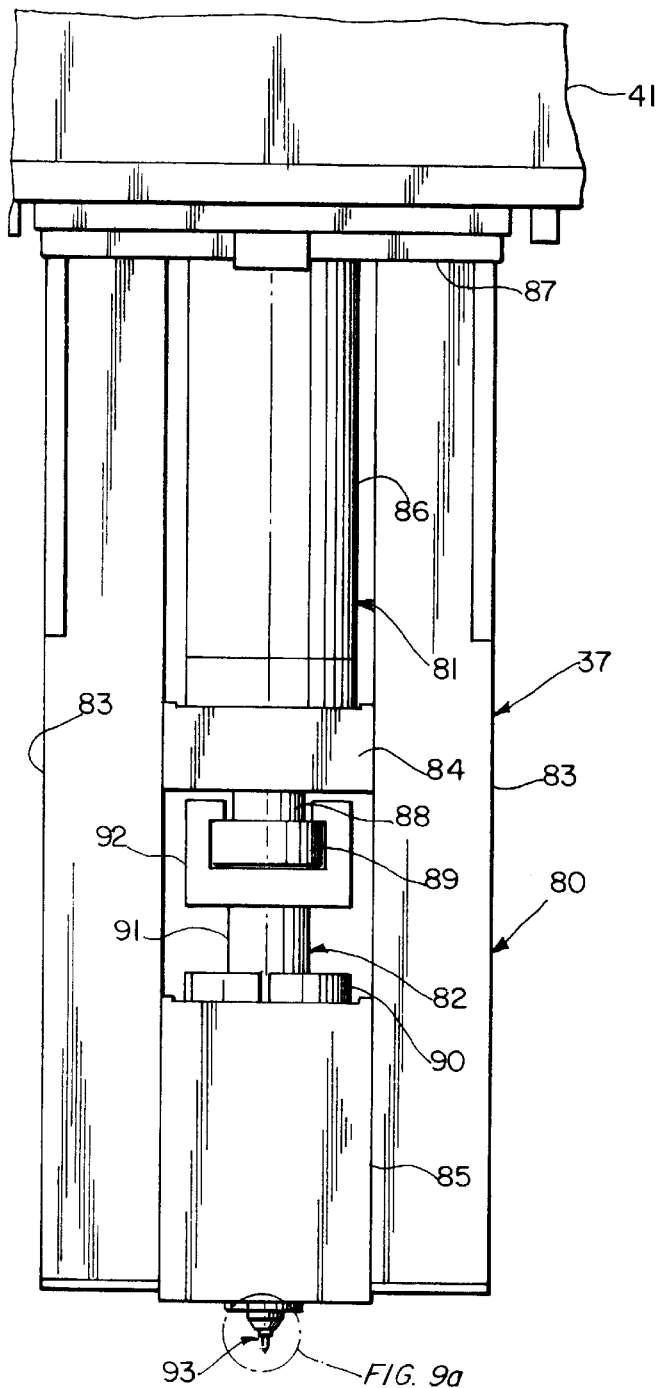
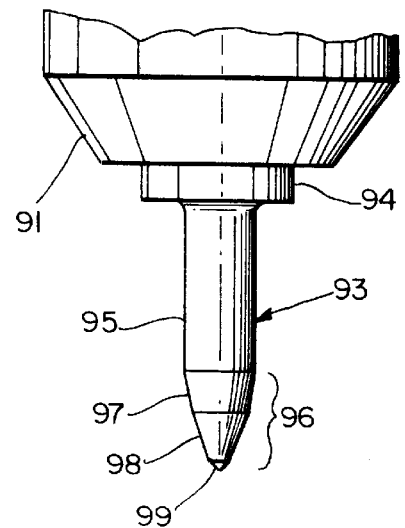
FIG. 9a
FIG. 9

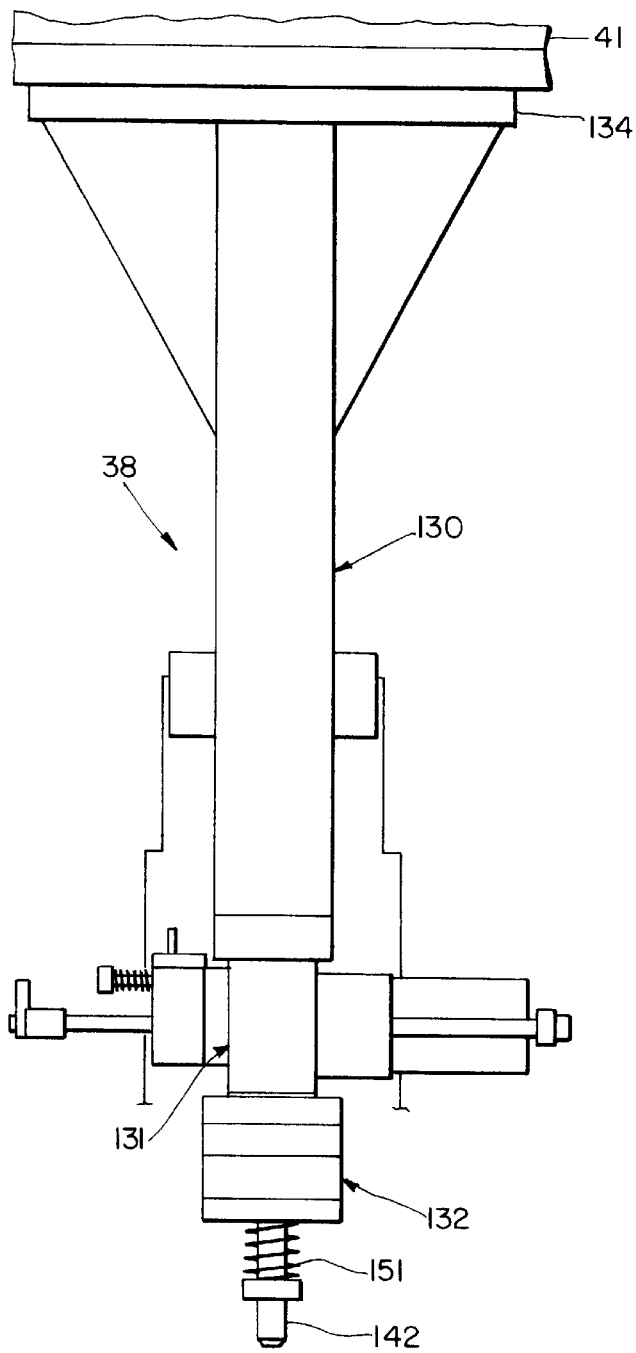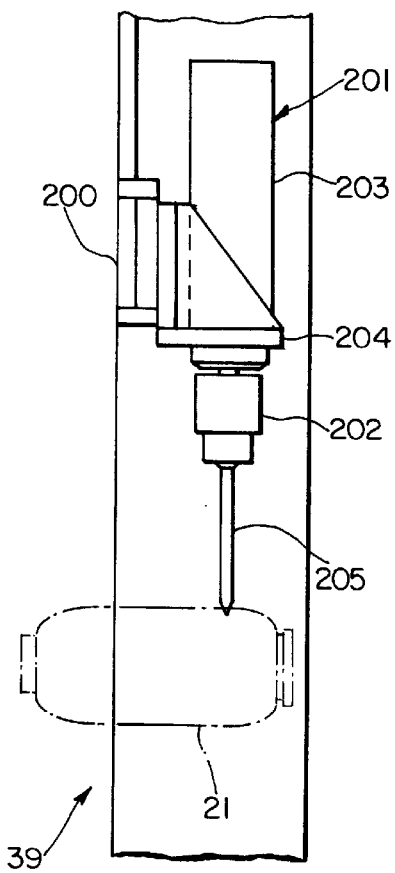
FIG. 13
FIG. 19

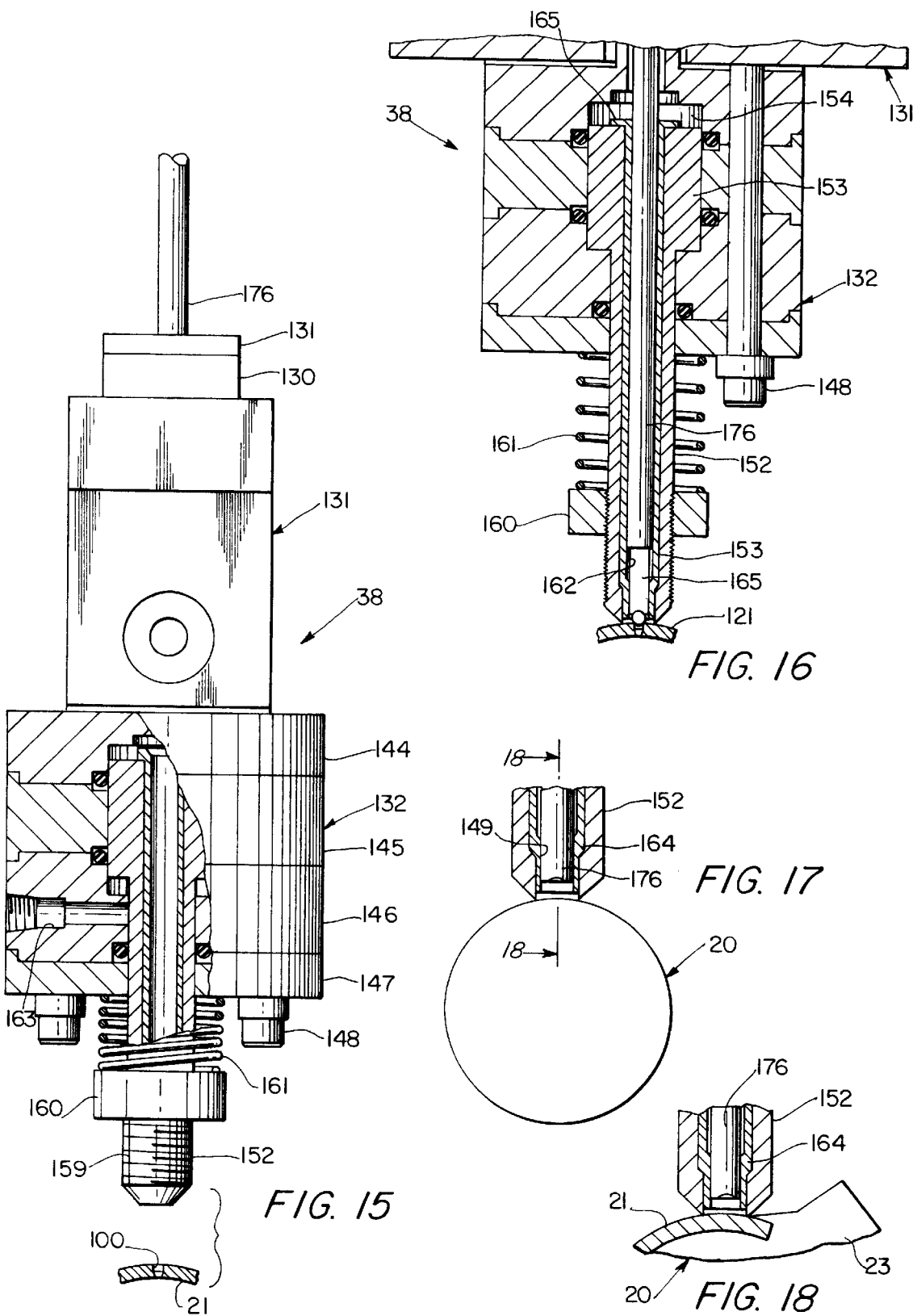

APPARATUS AND METHOD FOR CHARGING CANISTERS WITH A HIGH PRESSURE GAS

This application is a division of application Ser. No. 08/586,298, filed Jan. 16, 1996, which is now U.S. Pat. No. 5,760,360.

This invention relates to a novel apparatus for charging a canister of a type used in inflatable restraining systems for vehicles with an inert gas under high pressure and then sealing such canister. This invention further contemplates a novel method of injecting such gas into and sealing the canister.

BACKGROUND OF THE INVENTION

In conventional, inflatable restraining systems used in vehicles, there typically is provided a volume of compressed gas which is released upon collision of the vehicle to expand and thereby inflate a collapsed bag between the vehicle structure and a vehicle occupant. Such a compressed gas is stored in a metal canister which typically is installed in the steering column or dashboard of the vehicle, immediately ahead of the collapsed inflatable bag usually located at the center of the steering wheel go or on the dashboard. One of such canisters is illustrated in FIG. 5 of the accompanying drawings and will been seen to include an elongated, cylindrical body section 20 merging at its ends into annular rounded portions 21 and 22 providing a pair of axially disposed end openings. The end openings are closed by a pair of cup-shaped metallic plugs 23 and 24 usually welded to the main body section of the canister. Mounted in one of such end plugs and intended to be positioned adjacent an opening of the inflatable bag, is a propellant charge adapted to detonate and thus rupture an opening in the plug to release the stored gas within the canister. In the operation of the restraining system, upon one or more of various sensors installed at points about the periphery of the vehicle sensing a collision condition of the vehicle, an electrical signal is generated to cause the propellant charge to detonate and thus rapture a wall section of the end plug adjacent the inflatable bag.

Upon such rupture, the stored gas in the canister releases through the ruptured plug wall and inflates the bag to provide a cushioning barrier between the vehicle occupant and the vehicle structure. Another of such canisters is illustrated and described in U.S. Pat. No. 3,806,153 to James T. Johnson.

In the manufacture of such canisters, the main body sections thereof are formed from desired lengths of tubular stock having the annular, rounded end portions thereof formed by swaging or other suitable methods. The end plugs preferably are formed by stamping and are secured in the end openings by welding. One of such plugs is provided with an opening for injecting a gas under pressure into the canister. After the canister components have been formed and assembled, a gas pressure sensor is installed in the end plug provided with the gas filling opening, the propellant charge is installed in the opposite end plug and the canister is filled with gas and sealed.

In filling the type of canister described with a gas under pressure, it has been the prior practice to first insert a narrow filler tube into the end plug of the canister provided with the gas filling opening, between the side wall of the plug and the installed sensor, communicating with the interior of the canister through the opening in the bottom wall of the plug and engaging the bottom wall of the plug about the periphery of the opening in the bottom wall in sealing engagement. Then, while maintaining such sealing engagement between the end of the filler tube and the bottom wall of the canister plug, a gas under high pressure is injected through the filler tube and the plug opening into the canister, a fusible ball or bead is dispensed through the filler tube and deposited in the plug wall opening, a welding rod is extended through the filler tube into contact with the fusible ball seated in the plug wall opening, the welding rod is energized to fuse the ball and thus close the plug wall opening, and the welding rod and filler tube are sequentially retracted to complete the operation.

Such process of filling inflatable bag canisters has been found to be disadvantageous in several respects. The necessity of having to insert the filler tube into the end plug not only requires the filler tube to be fairly narrow in width but further requires the end plug be formed with a sufficiently greater depth to be able to accommodate both the gas leakage sensor and the insertion of the filler tube within the confined space of the end plug. The increased depth requirement of the plug results in having to machine the end plug instead of stamping it which has the effect of substantially increasing the cost of manufacture of the canister. A further disadvantage of such process is in having to position the filler tube with the welding rod extended therethrough into engagement with a fusible ball seated in the plug wall opening, in close proximity to the sensor device, which generates a substantial amount of heat which could result in damage and ultimate malfunction of the sensor. It thus has been found to be desirable to provide an apparatus and method for charging inflatable bag canisters of the type described with a high pressure gas in the range of 3,000 to 10,500 psi which is effective in overcoming such disadvantages of prior art systems and methods for charging such canisters.

Accordingly, it is the principal object of the present invention to provide an improved, apparatus for charging canisters used in inflatable restraining systems of vehicles with a gas under high pressure.

Another object of the present invention is to provide an improved apparatus for charging canisters used in inflatable restraining systems of vehicles with a gas under pressure in the range of 3,000 to 10,500 psi.

A further object of the present invention is to provide an improved apparatus for charging an inflatable bag canister of a vehicle restraining system in a manner not interfering with any propellant charge or gas leakage sensor device typically provided on such canisters.

A still further object of the present invention is to provide an apparatus for charging a canister formed with a pair of cup-shaped plugs closing openings at opposite ends of the canister accommodating a propellant charge and a gas leakage sensor, requiring comparatively shallow plug depths, permitting such plugs to be stamped in lieu of having to be machined.

Another object of the present invention is to provide an improved apparatus for charging an inflatable bag canister used in a restraining system of a vehicle which is comparatively simple in design, comparatively easy to manufacture, economical to operate and highly effective in performance.

A further object of the present invention is to provide a novel assembly for sequentially forming a seal about a gas filling opening in an inflatable bag canister used in a vehicle restraining system, injecting a gas under pressure through such opening into the canister while maintaining such seal, and then depositing a fusible ball in such gas filling opening and fusing it to close the opening while continuing to maintain such seal.

A still further object of the present invention is to provide an improved method for charging an inflatable bag canister used in a vehicle inflatable restraining system with a gas under high pressure.

Other objects and advantages of the present invention will become more apparent to those persons having ordinary skill in the art to which the present invention pertains from the accompanying drawings taken in conjunction with the following description.

DESCRIPTION OF THE DRAWINGS

FIG. 5 is an enlarged, side elevational view of an inflatable bag canister adapted to be charged with a gas under pressure in the apparatus shown in FIGS. 1 and 2, illustrating the orientation in which the canister as retained by the fixture shown in FIGS. 3 and 4.

FIG. 6 is an enlarged, vertical cross-sectional view of a rounded shoulder portion of the canister, designated in FIG. 5.

FIGS. 6a through 6d are views similar to the view shown in FIG. 6, illustrating sequentially the forming of a gas filling opening in the rounded shoulder portion of the canister, the depositing of a fusible ball in such opening and the closure and sealing of the opening by having fused the ball deposited in the opening.

FIG. 9 is a front elevational view of an assembly mounted at a second station on the apparatus shown in FIGS. 1 and 2 for forming a gas filling opening in a canister disposed on a retainer fixture positioned at such second station.

FIG. 9a is an enlargement of the puncturing tool designated in FIG. 9.

FIG. 13 is a side elevational view of the gas charging assembly shown in FIG. 12.

FIG. 15 is an enlarged view of the lower portion of the gas charging assembly shown in FIG. 13, having a portion thereof broken away.

FIG. 16 is a view similar to the view shown in FIG. 14, illustrating the lower portion of the gas charging assembly with a welding rod and gas filler tube shown in an extended position in engagement with a canister.

FIG. 17 is an enlarged, cross-sectional view of an end portion of the filler tube shown in FIG. 16, positioned in contact with a canister.

FIG. 18 is a cross-sectional view taken along line 18—18 in FIG. 17, having a portion thereof broken away.

FIG. 19 is a front elevational view of a drill assembly, positioned at a fourth station on the apparatus and operatively engagable with a canister mounted on a retaining fixture also positioned at such fourth station.

DESCRIPTION OF THE PREFERRED EMBODIMENT OF THE INVENTION

Figure 8:
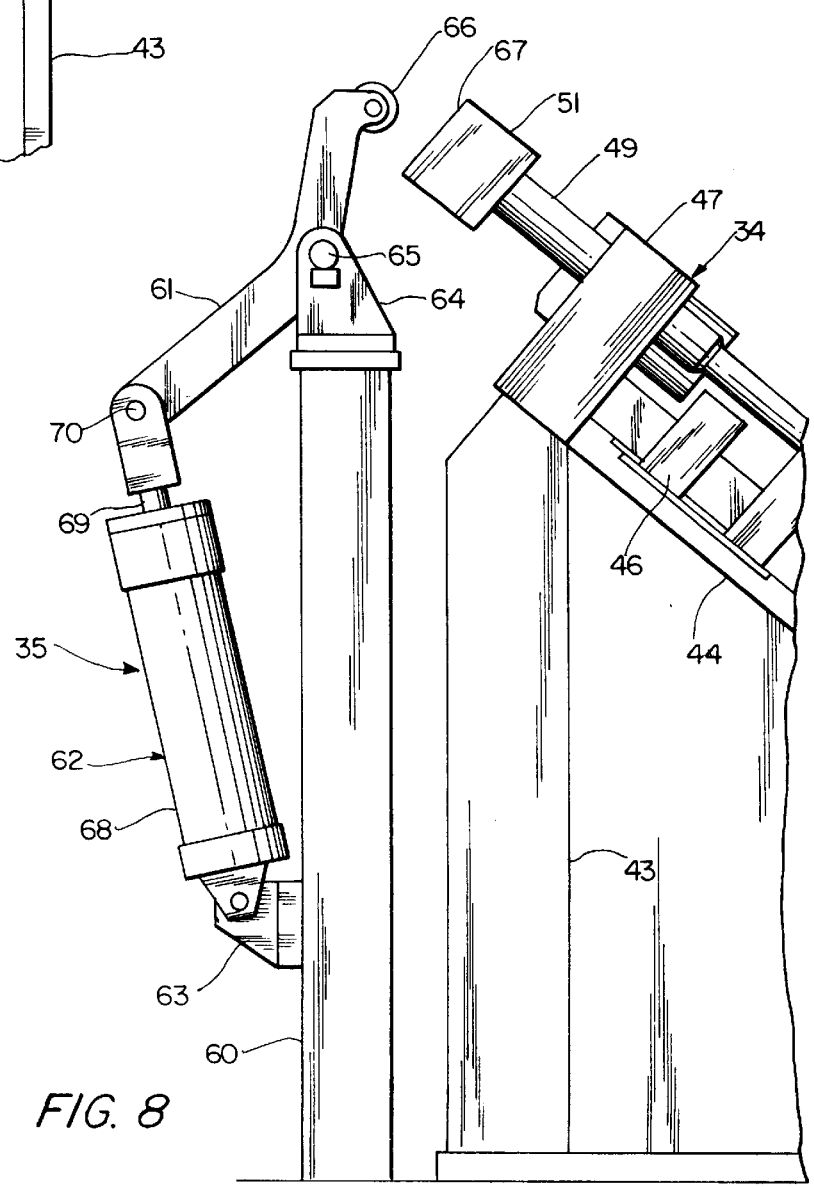
FIG. 8 is a side elevational view of a mechanism disposed at a canister loading and unloading station of the apparatus shown in FIGS. 1 and 2, operable to actuate a canister retaining fixture as shown in FIGS. 3, 4 and 7 to permit the loading and unloading of canisters onto and off of the retaining fixture.
Figure 10:
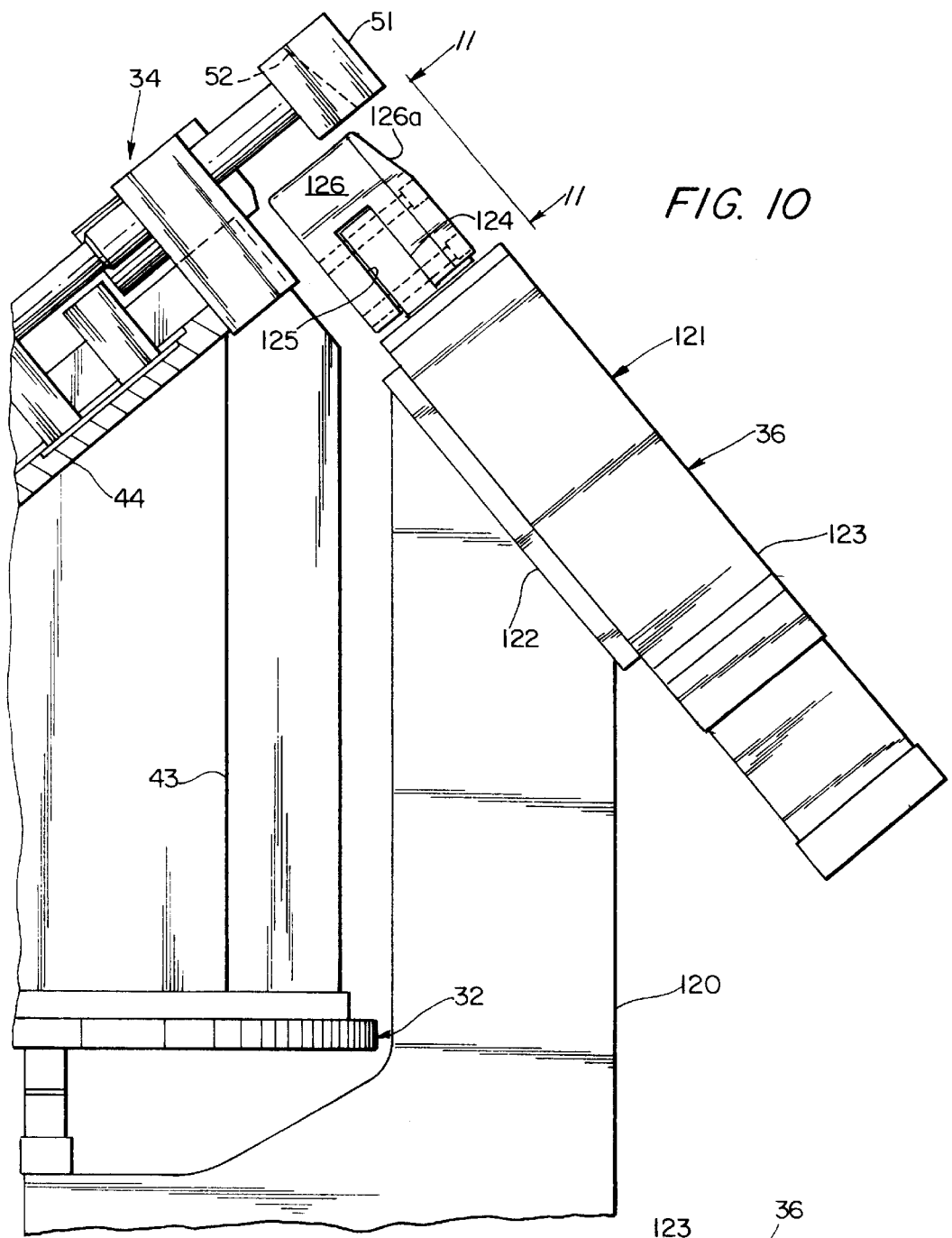
FIG. 10 is a side elevational view of a wedging assembly positioned at the second and third stations of the apparatus and cooperable with a canister retaining fixture also positioned at such second and third stations, for enhancing the retention of a canister supported on the fixture.
Figure 11:
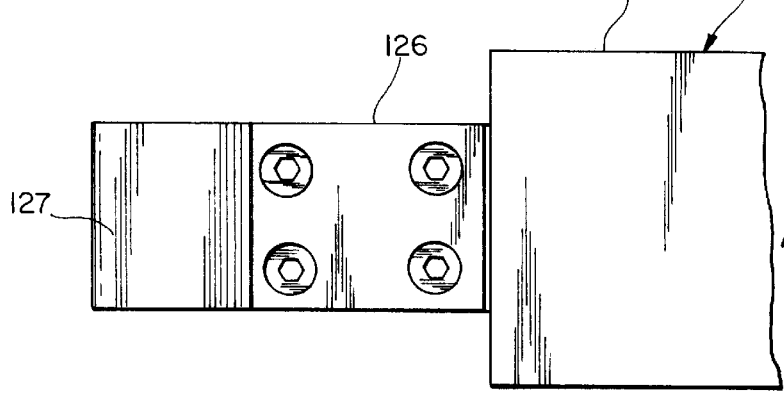
FIG. 11 is an enlarged view taken along line 11—11 in FIG. 10.

Referring to the drawings, there is illustrated an embodiment of the invention. The embodiment consists of an apparatus 30 generally including a main support frame 31, a rotatable platform 32 attached to a rotary indexing unit 33 seated on the main frame, a plurality of canister retaining fixtures 34 mounted on platform 32, spaced 90° apart thereon relative to the axis of rotation of the platform and adapted to be cycled sequentially through first, second, third and fourth work stations relative to the main support frame, also spaced 90° apart, a fixture release assembly 35 mounted on the main support frame at the first work station and operatively engageable with a canister retaining fixture positioned at the first work station, as best shown in FIG. 8, a wedging assembly 36 mounted on the main support frame at the second work station and operatively engageable with a canister retaining fixture positioned at the second work station, as best shown in FIGS. 10 and 11, a hole forming assembly 37 mounted on the main support frame at the second work station and operatively engageable with a canister mounted on a retaining fixture positioned at the second work station, as best shown in FIGS. 1 and 9, a wedging assembly similar to wedging assembly 36 mounted on the main support frame at the second work station and operatively engageable with a canister retaining fixture also positioned at the third work station, a gas charging and sealing assembly 38 mounted on the main support frame at the third work station and operatively engageable with a canister mounted on a retainer fixture also positioned at the third work station, as best illustrated in FIGS. 12 through 18, and a defective weld processing assembly 39 mounted on the main support frame at the fourth work station, and operatively engageable with a canister mounted on a retaining fixture also positioned at the fourth work station, as best shown in FIG. 19.

Figure 1:
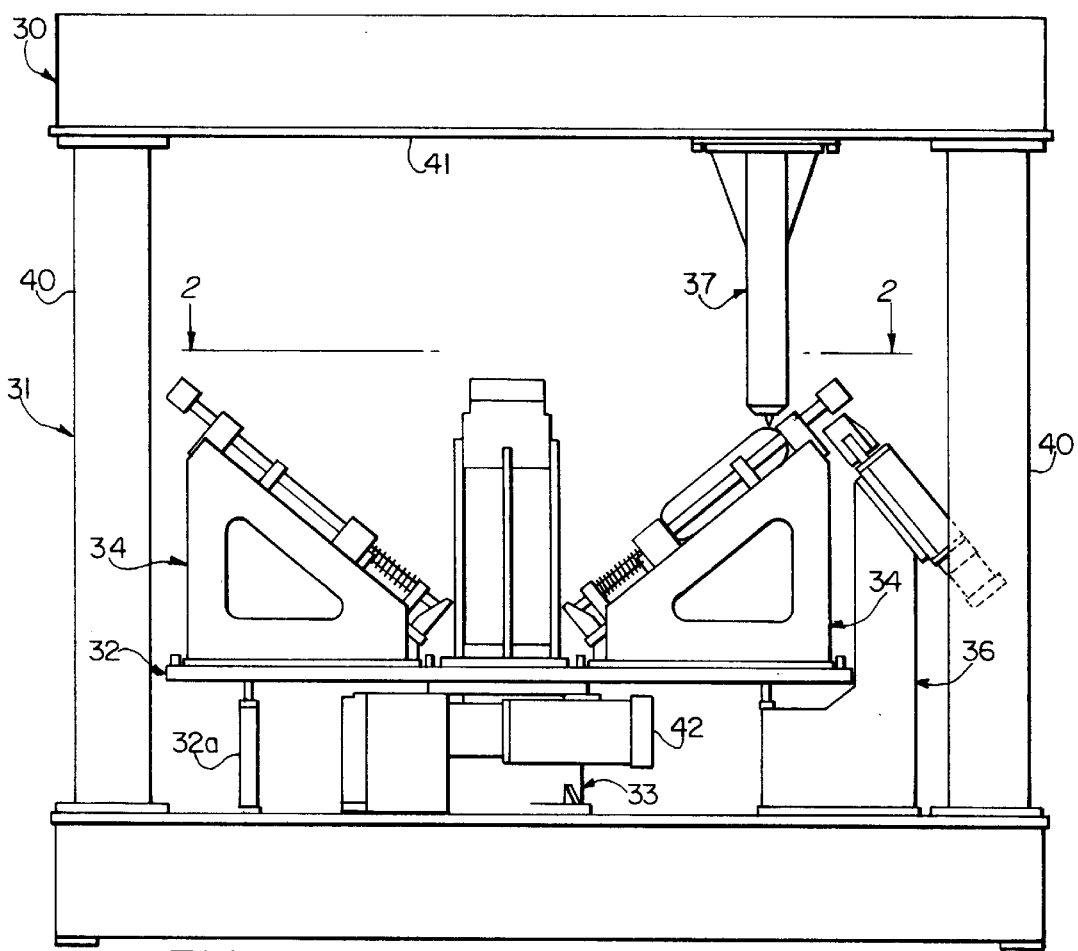
FIG. 1 is a side elevational view of an embodiment of the present invention which provides for mounting an empty inflatable bag canister on a retaining fixture in a selected orientation, forming a gas filling opening in the canister, charging the canister with a gas under high pressure through the formed opening, closing and sealing the opening and then drilling and opening to release the gas if the closure is determined to be defective.
Figure 2:
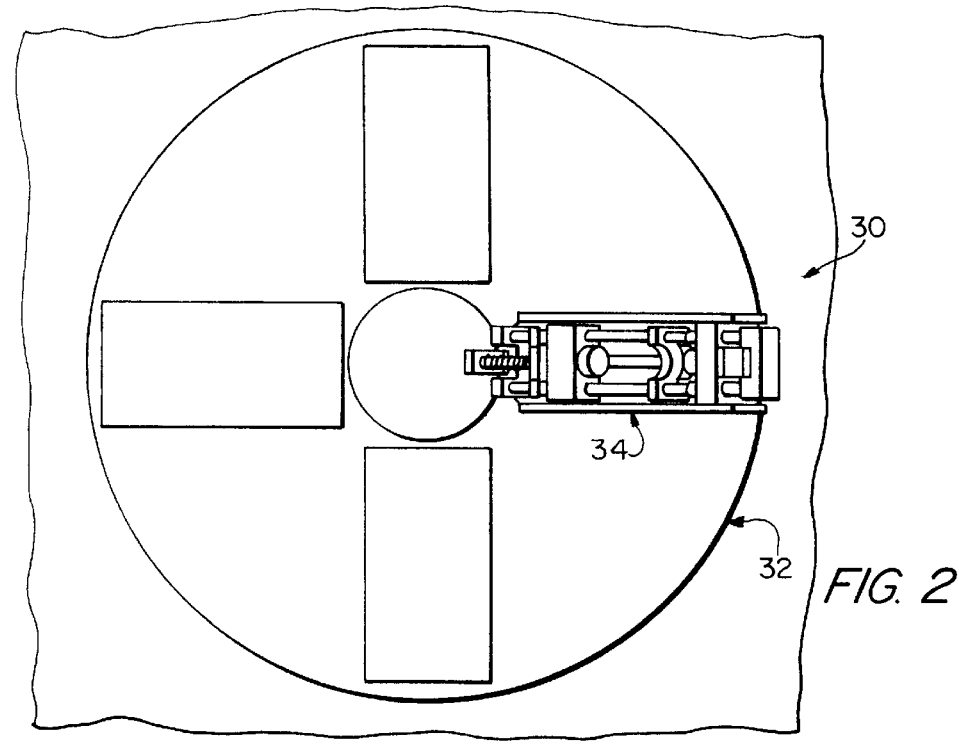
FIG. 2 is a cross-sectional view taken along line 2—2 in FIG. 1, illustrating only one of the canister retaining fixtures.

As best shown in FIGS. 1 and 2, main support frame 31 includes a substantially rectangularly-shaped base member, a plurality of post members 40 rigidly secured to and positioned at the corners of the base member and a plurality of beam members 41 supported on and spanning pairs of adjacent post members. Indexing unit 33 is rigidly mounted on the base member and is provided with a vertically disposed shaft to which platform 32 is secured for rotation therewith about the vertical axis of the shaft.

Platform 32 is supported at its radially inwardly disposed portion on the indexing unit, and is further supported at its radially outwardly disposed portion on a set of circumferentially spaced support members 32a. Platform 32 is adapted to be indexed through the several work stations by means of an electric motor 42 mounted on indexing unit 33 and operatively connected to the shaft secured to the platform through a suitable gear reduction mechanism. Indexing motor 42 is operated by a conventional controller which further operates the other operating components of the apparatus in a sequential and coordinated manner.

CANISTER RETAINING FIXTURES

Figure 3:
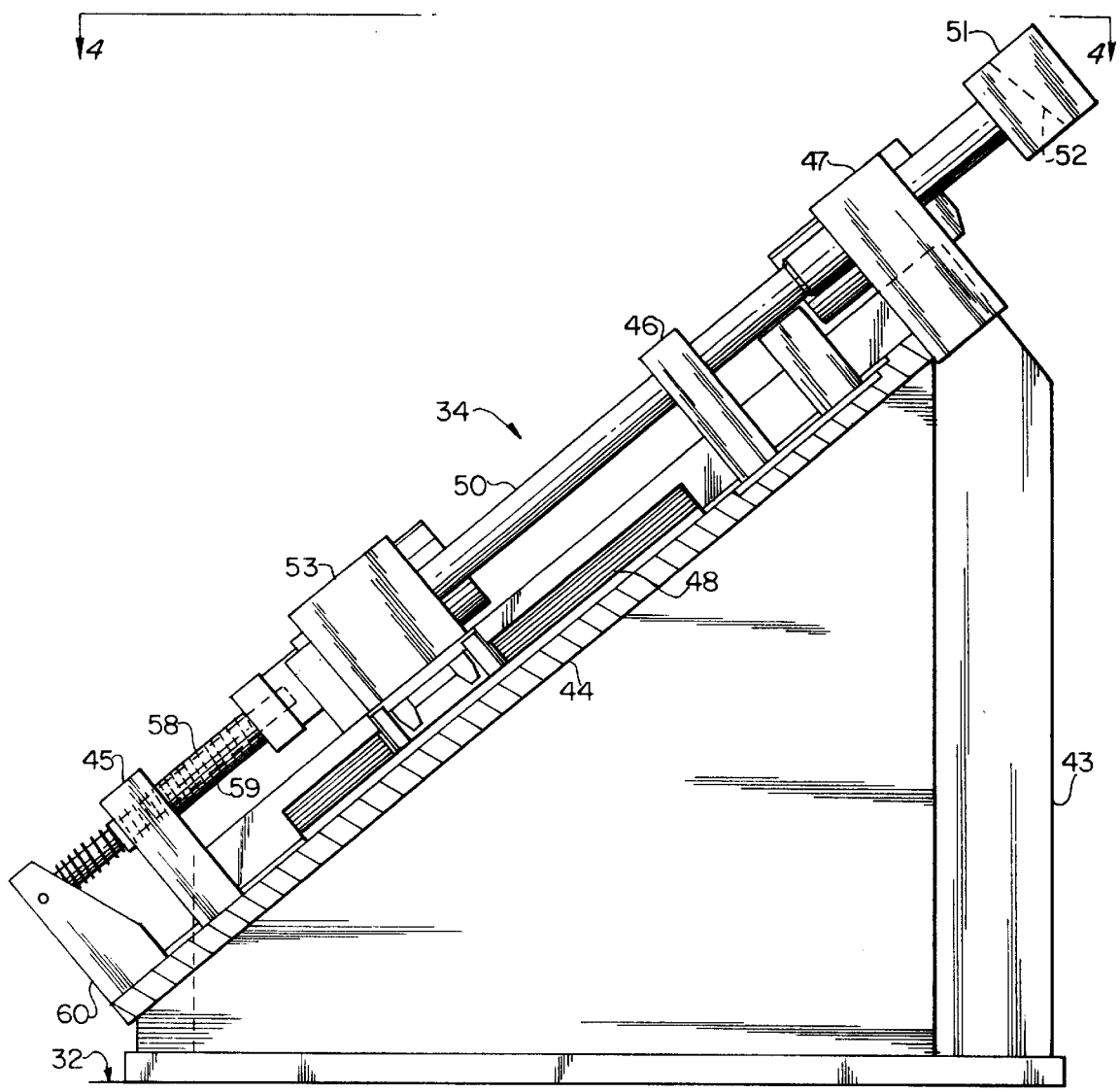
FIG. 3 is an enlarged, side elevational view of one of the fixtures shown in FIGS. 1 and 2.
Figure 4:
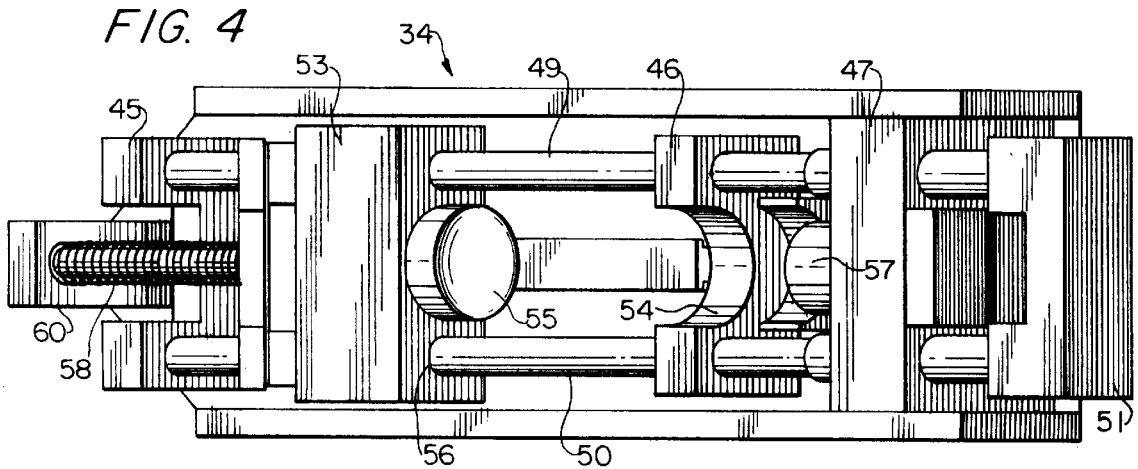
FIG. 4 is view taken along line 4—4 in FIG. 3.
Figure 7:
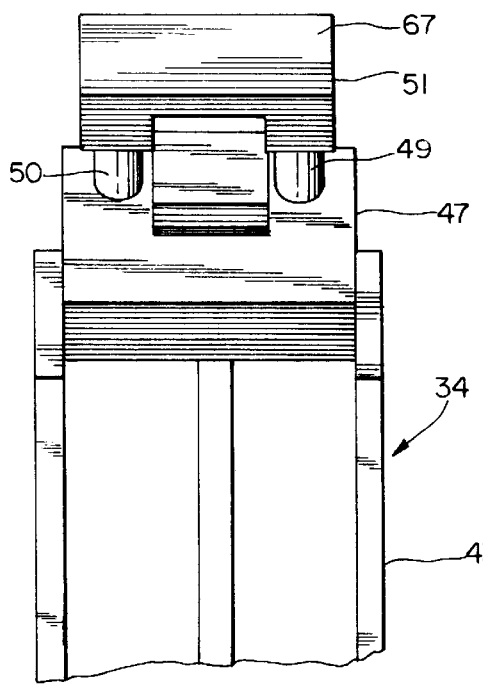
FIG. 7 is an end view of the fixture shown in FIGS. 3 and 4, having a lower portion thereof broken away.

FIGS. 3, 4 and 7 best illustrate the construction of each of the canister retaining fixtures. Each of such fixtures includes a vertically disposed bracket 43 rigidly mounted on platform 32, in a position disposed radially relative to the axis of rotation of the platform. Facing inwardly and rigidly secured to support bracket 43 at an angle of 39.5° is a base plate member 44. Rigidly secured to base plate member 44 and spaced along the length thereof is a set of fixed block members 45, 46 and 47. Disposed between fixed block members 45 and 46 and also rigidly secured to base plate member 44 is a longitudinally disposed guide track 48. A pair of parallel guide rods 49 and 50 are journaled in aligned openings in fixed block members 45, 46 and 47, which are rigidly secured at their outer, upper ends to a head block member 51 provided with an inwardly and downwardly facing cam surface 52 disposed between the guide rods. A displaceable abutment member 53 is rigidly secured to guide rods 49 and 50 at a point between fixed block members 45 and 46 and is adapted to ride along guide track 48. Displaceable abutment member 53 is provided with a pair spaced openings longitudinally aligned with the spaced openings in fixed block members 45 and 46 for receiving portions of the guide rods therethrough, to which the displaceable abutment member is secured. A canister 20 as shown in FIG. 5 is adapted to be nested between displaceable abutment member 53 and fixed abutment member 47 in an operable position for forming a gas filling opening in a rounded shoulder portion thereof at the second work station by means of the hole forming assembly, and filled with a gas through the formed opening and sealed at the third work station by the gas charging and sealing assembly.

Positioned on the fixture, the cylindrical body portion of a canister is adapted to rest on an arcuate surface 54 disposed at the bottom of a recess formed in fixed block member 46, an end portion thereof is adapted to be engaged by a concave surface 55 formed on a forwardly projecting section 56 of displaceable abutment member 53, and an opposite end portion thereof is adapted to be engaged by a concave surface formed on a rearwardly projecting section 57 provided on fixed abutment member 47. A canister in the nested position as described is adapted to be yieldably retained in such position with its centerline disposed at the selected angle of 39.5° by means of a spring 58 wound about a support rod 59 and interposed between a fixed base member 60 and moveable abutment member 53. It will be appreciated that upon rearward displacement of moveable abutment member 53 against the biasing action of spring 58, a canister may be positioned either manually or by mechanical means such as by a pick-and-place type of robot, between moveable and fixed abutment members 53 and 47, and upon release of the restraining force of spring 58, the moveable abutment member will be caused to ride upwardly on track 48 under the action of the spring to firmly urge the loaded canister in position between the moveable and fixed abutment members.

The displaceable abutment member of a fixture positioned at the first work station may be displaced away from the fixed abutment member thereof against the biasing action of spring 58 to permit the loading and unloading of a canister by means of fixture release assembly 35 disposed at the first station and supported on the main frame of the apparatus. Referring to FIG. 8, the assembly includes a post member 60, a crank member 61 and a pneumatic cylinder assembly 62. Post member 60 is adapted to be aligned with a fixture 34 positioned at the first station and includes a support bracket 63 disposed on a lower, outer side of the post member and a clevis 64 mounted on the upper end thereof, provided with a support pin 65. Crank 61 is pivotally mounted at an intermediate point thereof on support pin 65 and includes a roller 66 on an upper arm portion thereof engageable with an outer surface 67 of head block member 51 of the fixture. Pneumatic cylinder assembly 62 consists of a cylinder member 68 pivotally connected at a lower end thereof to support bracket 63 and a rod member 69 connected to an outer arm portion of crank 61 by means of a connecting pin 70. It will be appreciated that by supplying air under pressure to the base end of cylinder member 68 to extend rod member 69, the crank will be pivoted to cause roller 66 to engage head block member 51 and displace abutment member 53 of the fixture against the biasing action of spring 58 and thus permit a canister to be loaded onto or removed from the fixture positioned at the first station, either manually or mechanically by means of a robot or another mechanism.

HOLE FORMING ASSEMBLY

Positioned at the second station, displaced 90°0 from the first station and depending from an upper beam section of the main frame is hole forming assembly 37. As best shown in FIG. 9, the assembly includes a vertical, depending support structure 80, a pneumatic or hydraulic ram assembly 81 secured to and supported on structure 80 and a hole punching unit 82 also supported on structure 80 and coupled to the ram assembly. Support structure 80 generally consists of a set of depending members 83 provided with an upper cross-piece member 84 and a lower cross-piece member 85. The ram assembly includes a vertically disposed cylinder member 86 seated at its lower end on cross-piece member 84 and engaging base plate member 87 at its upper end, and a ram member 88 extending through a vertical opening in cross-piece member 84 and having an enlarged, annular flange portion 89 at its lower end.

Hole punching unit 82 is of a conventional construction consisting of a bearing 90 mounted on cross-piece member 85 and a shaft 91 vertically displaceable in a guide opening in bearing 90 and axially aligned with ram member 88. The upper end of shaft 91 is formed with a member 92 coupled to the flanged portion of ram member 88 and the lower end thereof is provided with a punching tool 93.

As best seen in FIG. 9a, tool 93 includes an upper cylindrical base section 94 received within an opening in shaft member 91 and rigidly secured thereto, an intermediate, cylindrical shank section 95 and a lower pointed section 96. The pointed section includes an upper, inverted frusto-conically configured portion 97, an intermediate, inverted frusto-conically configured portion 98, and a lower pointed, conically configured tip section 99. Portions 97, 98 and 99 of the punching tool which are adapted to penetrate and form an opening in a rounded shoulder wall portion of a canister positioned beneath the tool, have surfaces displaced at angles relative to the centerline of the tool in progressively increasing degrees in order to provide an opening in a canister wall being pierced of a selected configuration for receiving and retaining a fusible body as later will be described. Preferably, the angles of the side walls of portions 97, 98 and 99 relative to the centerline of the tool are in the order of 10°, 20° and 45°, respectively, so that when the tool penetrates a wall portion 21 of a canister mounted on a fixture positioned at the second work station, as shown in FIG. 6a, the tool will form an opening 100 having a converging configuration, as shown in FIG. 6b, to receive and position a spherical, fusible body 101, as shown in FIG. 6c.

Hole forming assembly 36 is positioned at the second station so that upon indexing platform 32 90° from the first station, a rounded shoulder portion 21 of a canister supported on the fixture will be vertically aligned below punching tool 93. Upon supplying fluid under pressure to the base end of cylinder member 86, the ram member will be displaced downwardly a predetermined distance to cause the punching tool to penetrate and thus pierce wall portion 21 of the canister as shown in FIG. 6a to provide the opening 100 as shown in FIG. 6b.

Wedging assembly 36 is positioned at the second work station and is operatively engageable with a fixture 34 positioned at the second station for enhancing the retention of the canister mounted on the fixture to be penetrated by hole forming assembly 37. The wedging assembly is best shown in FIGS. 10 and 11 and consists of a vertical support member 120 mounted on the main frame of the apparatus and disposed in radial alignment with a fixture positioned at the second work station, and a ram assembly 121 mounted on the upper end of the support member. Support member 120 is provided with a base plate 122 mounted on the upper end thereof which is disposed substantially perpendicular to the extended centerline of a canister mounted on the fixture positioned at the second work station. Ram assembly 121 consists of a cylinder member 123 rigidly mounted on base plate 122 and a ram member 124. A floating wedge member 126 is mounted on the end of the ram member received within a recess 125 therein, by means of a set of bolts extending through oversized openings in the ram member.

Upon extension of the ram member, wedge member 126 is adapted to be received between spaced rod members 49 and 50 of the adjacent fixture, and an upper angled surface 126a thereof is adapted to engage angled surface 52 of head block member 51 in camming relation to cause block member 51 and correspondingly rod members 49 and 50 to further displace upwardly to urge displaceable abutment member 53 in firmer engagement with a canister supported thereon to enhance the retention of the canister in the fixture for the hole forming operation.

GAS CHARGING AND SEALING ASSEMBLY

The gas charging and sealing assembly 38 is best illustrated in FIGS. 12 through 18. The assembly is positioned at the third work station, displaced approximately 90° from the second work station relative to the axis of rotation of platform 32, and includes a support structure 130 depending from the overhead section of the main frame of the apparatus, a dispensing block member 131 mounted on and depending from support structure 130, a sealing head assembly 132 mounted on and depending from block member 131 and a welding rod assembly 133 mounted on the upper end of support structure 130 and having a welding rod at a lower end thereof received and displaceable through aligned openings of block member 131 and sealing head assembly 132.

Support structure 130 is provided with an upper base plate member 134 rigidly secured to an underside of the overhead structure of the main frame, a pair of depending members 135 and 136 secured to the base plate member and a lower mounting plate member 137. The support structure is positioned on the overhead structure 41 so that a vertical centerline thereof will be vertically aligned with an opening in a canister supported on a fixture positioned at the third work station. The components of the support structure are formed of suitable steel materials to provide a sufficient rigidity to the entire assembly.

Figure 14:
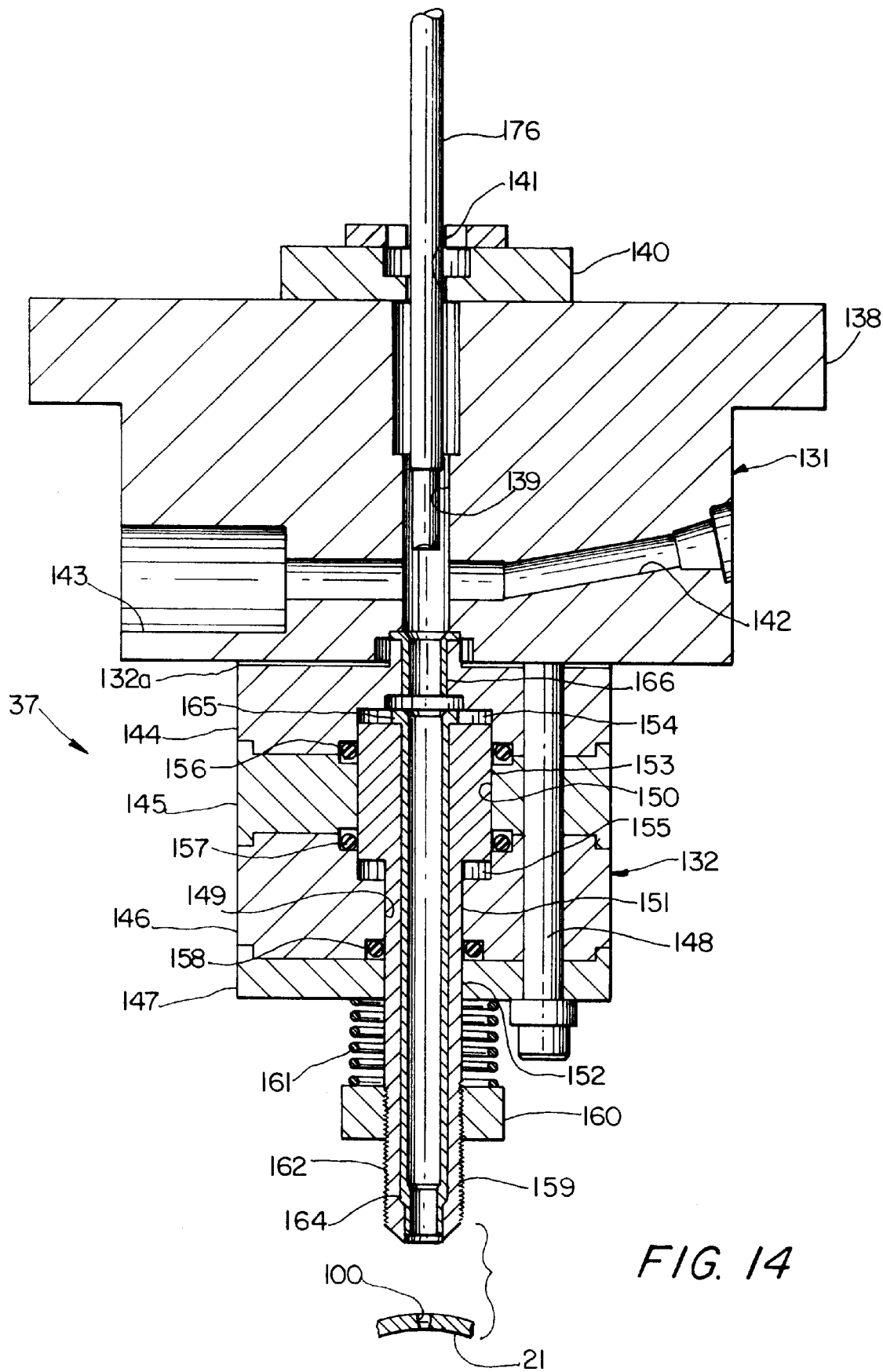
FIG. 14 is an enlarged, vertical cross-sectional view of the lower portion of the gas charging assembly shown in FIG. 12.

Block unit 131 is best illustrated in FIG. 14 and will be seen to consist of a block of material having a peripheral flange section 138 provided with suitable openings for receiving a set of bolts for securing the block member to lower base plate member 137, and a vertical opening 139 closed at an upper end by a plate member 140 provided with a coaxially disposed opening 141. Communicating with opening 139 is a gas supply passageway 142 and a fusible ball supply passageway 143. Passageway 142 is adapted to be connected to a system for selectively supplying an inert gas under pressure up to 10,500 psi to opening 139 in block member 131. Passageway 143 is adapted to be connected to a mechanism for selectively dispensing fusible balls through passageway 143 and into opening 139. Such a mechanism can be of a type as illustrated and described in U.S. Pat. No. 5,196,669.

Sealing head assembly 132 consists of a set of annular plate sections 144 through 147 nested and secured together and as a unit to the underside of block member 131 by means of a set of bolts 148. The plate sections as a unit provide an elongated axial bore 149 in head assembly 132 longitudinally aligned and communicating with elongated bore 139 in block member 131, having an enlarged section 150. Disposed in elongated bore 149 and displaceable longitudinally therein is a piston member 151 having a rod section 152 disposed within elongated bore 149 and projecting outwardly therefrom, and a piston head section 153 disposed within enlarged bore section 150. As best shown in FIG. 14, the cylindrical side wall of piston head section 153 engages and is displaceable longitudinally relative to the wall surface of enlarged bore section 150, and the longitudional dimension of head section 153 is less than the longitudinal dimension of enlarged bore section 150, to provide an upper chamber 154 and a lower chamber 155. Inner adjoining surfaces of annular plate sections 144, 145 and 146 are recessed and are provided with a set of O-rings 156 and 157 forming air tight seals between the adjoining plate sections and the head section of the piston member. Similarly, the inner surface of annular plate member 146 engaging outer plate section 147 is recessed and is provided with an O-ring 158 forming an air tight seal between plate sections 146 and 147 and rod section 152 of the piston member.

Annular plate sections 144 through 147 preferably are formed of a nonmagnetic stainless steel material and are insulated from block member 131 by an insulation spacer 132a preferably formed of a glass phenolic material.

The lower end of piston rod section 152 is provided with exterior threads 159 on which there is threaded a collar 160.

A preloaded, helical spring 161 is disposed on the exterior portion of rod section 152, interposed between end plate section 147 and collar 160. Such spring is sized to provide 1,200 to 2,000 pounds of force to displace the piston member downwardly into a firm sealing engagement with a wall portion 21 of a canister disposed on a fixture 34 positioned at the third work station, with elongated axially disposed passageway 149 therein communicating with an opening 100 of the canister, as shown in FIGS. 16 through 18.

Piston member 151 is maintained in a retracted, inoperative position as shown in FIGS. 14 and 15, with spring 161 in a compressed condition, by means of gas under pressure being supplied through a fluid passageway 163 in plate section 146 and the annular clearance space between plate section 146 and rod section 152 of the piston member to lower chamber 155, where it acts on the lower annular surface of head section 153 to displace the piston member to the inoperative position, as shown in FIG. 14. Upon discontinuance of the supply of gas under pressure to lower chamber 155, it will be appreciated that the piston member, being no longer restrained, will displace downwardly under the biasing action of spring 161 to cause the lower end of rod section 152 to engage wall portion 21 of a canister positioned therebelow, as shown in FIG. 16.

With the piston member engaging the canister, as shown in, FIGS. 16 through 18, and the interior passageway of the piston member communicating with opening 100 in the canister, a gas under pressure supplied through fluid passageway 142 will be caused to flow through passageway 139 in block member 131, the upper end of elongated bore 149 in block member 132, an axially disposed passageway 162 in the piston member and opening 100 in canister wall 21 to pressurize the canister. As such gas under pressure is supplied to the canister, it correspondingly will be supplied to upper chamber 154 where it will act on the upper, annular surface of head section 153 to apply an additional force on the piston member, enhancing the force applied by spring 161 and thereby urging the end of the rod section of the piston member into greater sealing engagement with the canister being charged. After the canister has thus been charged to the desired pressure, the assembly is operable to dispense a fusible ball 101 through passageway 143, passageway 139, passageway 149 in assembly 132 and axial passageway 162 in the piston member, into opening 100 in the canister where it becomes seated as shown in FIG. 6c, while continuing to maintain the lower end of the piston member in firm sealing engagement with the canister and continuing to supply gas under pressure in the assembly. Under such conditions, welding rod assembly 133 may be operated to fuse the fusible ball seated in opening 100 of the canister to close and seal the canister charged with a gas in the range of 3,000 to 10,500 psi.

Elongated bore 162 in the piston member is provided with a liner 164 formed of an insulating material, preferably a glass phenolic material. The upper end of the liner is formed with an annular lip portion 165 which slightly overlaps the upper surface of piston head section 153, and is adapted to be received within an upper portion of elongated bore 149, in contact with an annular shoulder thereof to restrict the upward displacement of the piston member. The upper end of the cylindrical bore 149 is provided with a bushing 166, also formed of an insulating material, having an outwardly flared lip portion at the upper end thereof disposed between a portion of guide block 144 extending into an enlarged lower section of elongated bore 139 and an annular shoulder of such enlarged section.

Figure 12:
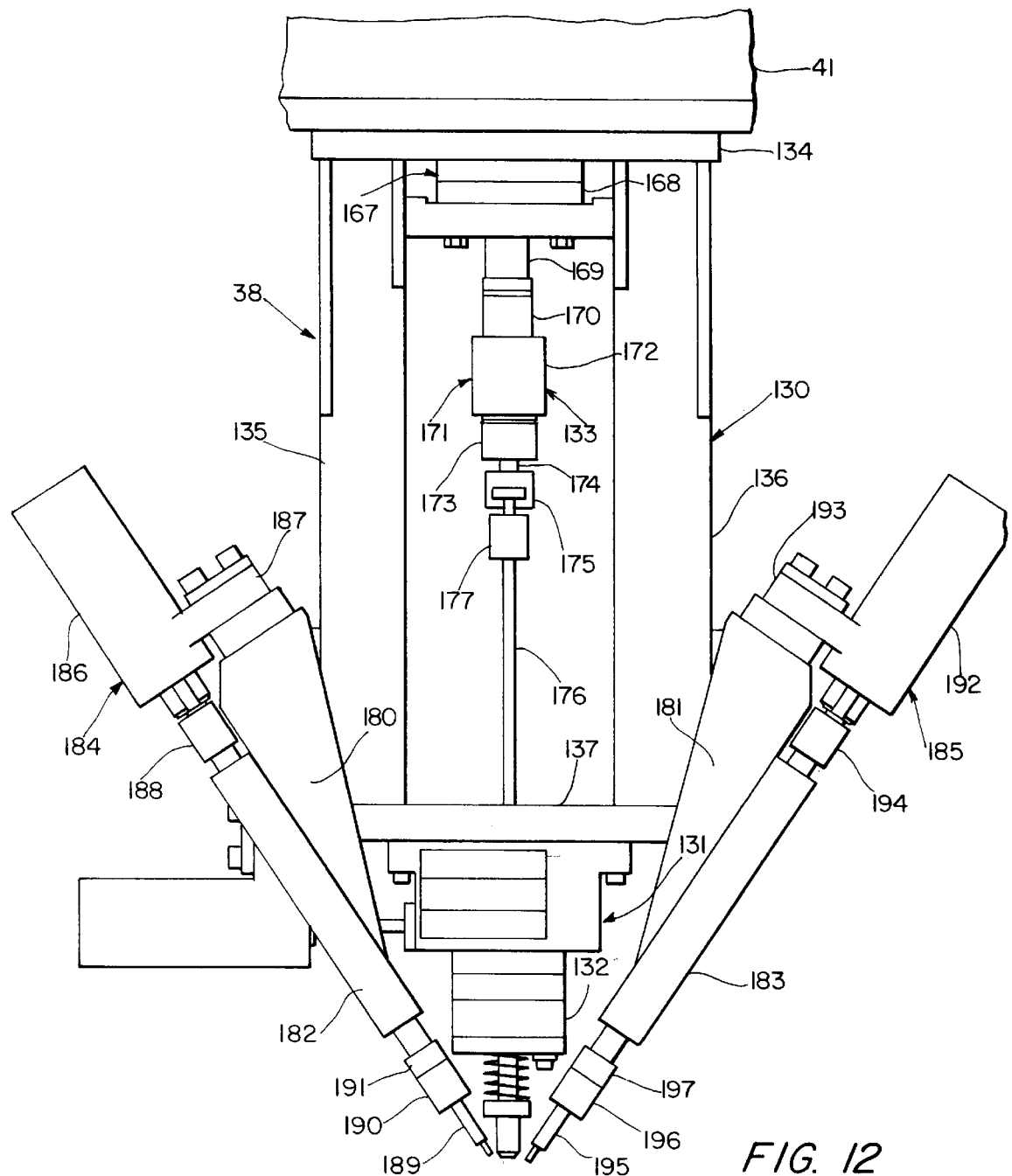
FIG. 12 is an enlarged, front elevational view of a gas charging assembly positioned at a third station, of the apparatus and cooperable with a canister mounted on a retaining fixture also positioned at such third station, for sequentially filling the canister with a gas under pressure through the gas filling opening formed at the second station and then sealing such opening.

Welding rod assembly 133 is best shown in FIG. 12 and is disposed in vertical alignment with piston member 151. The assembly includes an air cylinder assembly 167 providing a cylinder member 168 and a piston rod member 169. An electrical insulating member 170 is mounted on the lower free end of rod member 169, on which there is supported a coupling assembly 171. The coupling assembly includes an upper, inverted cup-shaped housing member 172, a lower housing member 173 threaded into the lower open end of housing member 172, a plunger member 174 having a spring seating upper head portion disposed within upper housing member 172 and a lower rod portion projecting through lower housing member 173, and a coil spring disposed in upper housing member 172 between the upper housing member and the spring seating head portion of plunger. 174. Plunger 174 further includes a depending coupling member 175 to which a welding rod 176 is attached, provided with a terminal member 177.

The welding-rod is disposed in vertical alignment with piston member 151 and is adapted to be received within elongated bore 139 in block member 131 and elongated bore 162 in piston member 151, and be displaced therein between an upper, retracted inoperative position as shown in FIG. 14 clear of passageways 142 and 143 in block member 131, and a lower, extended operative position in contact with a fusible body 101 seated in an opening 100 in a wall portion 21 of a canister retained on a fixture positioned at the third work station, by means of air cylinder assembly 167. The lower end of the welding rod is formed with a suitably recessed configuration so as to provide a good mechanical and electrical contact with a fusible body seated in a gas filling opening of the canister. Excessive downward pressure by the air cylinder is avoided by the displacement of the welding rod relative to rod member 169 permitted by the cushioning spring disposed in coupling assembly 171.

To prevent the leakage of charging gas from elongated bore 139 in block member 131, a suitable seal is provided between retaining plate member 140 and the portion of welding rod 176 passing through opening 141 in the plate member.

Rigidly secured to the lower end of support structure 130 and spaced 180° apart relative to the centerline of the welding rod assembly is a pair of downwardly converging brackets 180 and 181. Secured to such brackets is a pair of downwardly converging, tubular guide members 182 and 183 having centerlines intersecting each other and the vertical centerline of the welding rod assembly at a point below piston member 151. Mounted on brackets 180 and 181 is a pair of identical air cylinder assemblies 184 and 185. Cylinder assembly 184 includes a cylinder member 186 having a mounting bracket 187 seated on and secured to bracket 180, and a piston rod member 188 extending through and displaceable axially in tubular guide member 182. The lower free end of rod member 188 is provided with an electrode 189 provided with a terminal member 190, insulated from rod member 188 by an insulation member 191. Similarly, air cylinder assembly 185 includes a cylinder member 192 having a mounting bracket 193 seated on and secured to bracket 181 by means of a set of bolts, and a piston rod member 194 extending through and axially displaceable within tubular guide member 183. An electrode 195 is provided on the lower free end of rod member 194, having a terminal member 196 insulated from rod member 194 by means of an insulation member 197.

Terminal members 190 and 196 of electrodes 189 and 195 are connected to a secondary lead of a welding transformer, and terminal member 177 of welding rod 165 is connected to the other secondary lead of the transformer. When a canister is positioned at the third work station with a gas filling opening 100 vertically aligned with the welding rod assembly, a fusible body 100 is nested in the gas filling opening, the piston member is extended to engage the canister and form an air tight seal about the gas filling hole and the welding rod is extended to engage the fusible body seated in the gas filling opening as shown in FIG. 16, rod members 188 and 194 of assemblies 184 and 185 are adapted to be extended to cause electrodes 189 and 195 to engage the canister. Upon a suitable set of contacts being closed to complete the secondary circuit of the welding transformer, an electrical current of high amperage in the order of 2,000 amps for a short duration of time in the order of a fraction of a second will be applied to fuse the fusible body seated in the gas filling hole of the canister to close and seal the canister.

FIGS. 14 and 15 illustrate the gas charging and sealing assembly in an inoperative condition. In such condition, no gas under pressure is applied through passageway 142 to upper gas chamber 154, and gas under pressure is supplied to passageway 163 in the head assembly to lower gas chamber 155 to displace piston member 151 to an upper position against the biasing action of spring 161. Air pressure is supplied to the rod end of cylinder member 168 to retract welding rod 176 to an upper position above the level of passageways 142 and 143 in block member 131, and air pressure is supplied to the rod ends of cylinder members 186 and 192 to position electrodes 189 and 195 in retracted positions. In addition, a set of contacts in the secondary circuit of the welding transformer are disposed in an open condition.

When the indexing mechanism of the apparatus advances a fixture to the third work station so that a gas filling opening 100 of a canister is positioned in vertical alignment with the welding rod assembly, and suitable controls are operated, the supply of gas under pressure to lower gas chamber 155 is discontinued to allow spring 161 to extend piston member 151 into engagement with the canister, with longitudinal bore 162 communicating with gas filling opening 100 in the canister and the tip portion of the piston rod section about the periphery of the lower open end of bore 162 engaging the canister about the periphery of opening 100, in sealing arrangement. Gas under pressure is then supplied through passageways 142 and 139 and the passageways in the head assembly and piston member to charge the cylinder under a pressure in the range of 3,000 to 10,500 psi. As such gas is supplied to the canister, it further will be supplied to upper gas chamber 154 where it acts upon the piston member to enhance the sealing force applied to the piston by spring 161 thus assuring a firm sealing engagement of the piston member with the canister.

After a predetermined interval sufficient to charge the canister at the selected charging pressure and enhance the sealing engagement of the piston with the canister, and while maintaining the supply of gas under pressure, a fusible ball is dispensed through passageway 143 and the piston member to become nested in the gas filling opening of the canister. Then, while continuing to maintain the seal between the piston member and the canister and maintaining the assembly under pressure, further controls are operated to sequentially extend rod members 188 and 194 so that electrodes 189 and 195 engage the canister and provide good electrical contacts, welding rod 176 is extended into mechanical and electrical contact with the fusible ball seated in the gas filling opening, and appropriate contacts in the secondary transformer circuit are closed to provide current in the secondary transformer circuit sufficient to cause the fusible body to fuse and close the opening in the canister, sealing the pressurized canister.

After a further interval of time sufficient to allow the closure to cool and solidify, appropriate controls are operated to retract electrodes 189 and 195 out of contact with the canister, welding rod 176 is retracted to the position shown in FIG. 14, the supply of gas to passageway 142 is discontinued, allowing gas in upper chamber 154 to be vented, and gas under pressure again is supplied to lower gas chamber 155 to cause the piston member to retract upwardly out of sealing engagement with the canister against the action of spring 161. The gas charging and sealing assembly is then in condition to begin another cycle of filling and sealing the next canister to be advanced to the third work station.

Although the gas filling and sealing assembly shown in FIGS. 12 through 16 provides for dispensing a fusible body from a storage position within the assembly, it further is contemplated within the scope of the present invention to supply such fusible body from a storage position exterior of the assembly. In such alternate embodiment, it is contemplated that a mechanism would transfer the fusible body from an exterior storage position to a position below and vertically aligned with the welding rod, and that the assembly would operate to extend the welding rod down through the piston member to engage and attach the body and retract into the position shown in FIG. 14. In such an arrangement, the fusible body would be attached to the welding rod by a vacuum applied to an axial passageway in the welding rod or by any other suitable means.

In the inoperative condition of the alternate embodiment, assembly 38 would be in a condition essentially as shown in FIGS. 14 and 15 with the piston member, the welding rod and the electrodes 189 and 195 in their retracted postions. Upon operation of the assembly, suitable controls would be operated to first actuate a transfer mechanism to position a fusible body below the piston member in vertical alignment with the welding rod. With the fusible body thus positioned, further controls would be operated to extend the welding rod down into engagement with the fusible body, a negative pressure would be applied to the passageway in the welding rod to detachably secure the fusible body to the lower end of the welding rod and then the welding rod would be retracted to the position shown in FIG. 14. Thereafter, the assembly operates in the manner described in the previously described embodiment to charge the canister, position the fusible body in a gas filling opening in the canister, engage the welding rod and electrodes and then energize the secondary circuit of the welding transformer to fuse and close the gas filling opening in the canister.

To assure the firm retention of the canister being charged and sealed at the third work station, a wedging assembly similar to wedging assembly 36 is positioned at the third work station of the apparatus which is operatively engageable with the fixture positioned at the third work station in the manner previously described for drawing the fixed abutment member of such fixture more firmly into engagement with the canister to assure its retention on the fixture in proper orientation to position the gas filling opening therein in vertical alignment with the piston member and welding rod of the gas charging and sealing assembly.

DEFECTIVE CANISTER PROCESSING ASSEMBLY

Located at the third or fourth work station or at a position between such stations is a device for detecting a defective weld in a canister having been charged and sealed at the third work station. Such a device may consist of a gas leakage detector which is operable to indicate an unsatisfactory closure in a canister advanced from the third work station. Upon detection of such a defective closure in a canister by such a detection device, the assembly shown in FIG. 19, situated at the fourth work station of the apparatus, is operated to form an opening for releasing the gas in the defective canister charged at the third work station upon the positioning of the canister at the fourth work station. Assembly 39 includes a support structure 200, a cylinder assembly 201 and a drill unit 202. The support structure may be either mounted on the main support frame or independent thereof but adjacent the fourth work station. Cylinder assembly 201 may be positioned at any convenient angle and includes a cylinder member 203 supported on a bracket 204. Drill unit 202 is displaceable along the axis of cylinder member 203, intersecting the side wall of a canister supported on a fixture positioned at the fourth work station. It further is provided with a drill bit 205 adapted to engage and drill a hole in the side wall of the canister.

Upon detection of a defective closure in a canister advanced from the third work station, and the positioning of the canister at the fourth work station, suitable controls are operated to operate drill unit 202 and to supply fluid under pressure to the base end of cylinder member 203 to displace the drill bit to drill a relief hole in the side wall of the canister and allow the gas therein to be released. Upon release of the gas in the canister, the canister may be removed and scrapped or otherwise discarded.

In the event the defective weld detecting device fails to detect a defective closure of a canister advancing from the third work station, assembly 39 will not be activated and the fixture supporting the canister will be advanced past the fourth work station to the first work station where it is unloaded from the apparatus.

OPERATION

A conventional programmable controller functions to operate the apparatus as described. In particular, the controller functions to operate indexing mechanism 42 to advance support platform 31 in 90° increments and sequentially position a fixture 34 at each of the work stations, actuate assembly 37 to form a gas filling opening in a canister supported on a fixture positioned at the second work station, actuate the gas charging and sealing assembly to charge and seal a canister supported on a fixture positioned at the third work station, selectively actuate the weld removal assembly to remove a defective closure in a canister supported on a fixture positioned at the fourth work station and to return a canister to the first work station for removal if satisfactorily charged and sealed, or recycling if the closure has been detected to be defective and has been removed.

In a typical cycle of the apparatus as described, the controller first operates a suitable valve to supply fluid under pressure to the base end of cylinder member 68 of fixture release assembly 35 to extend rod member 69 and pivot crank 61 in a clockwise direction relative to FIG. 8. The pivotal movement of crank 61 will cause roller 66 to engage and displace block member 51 of a fixture positioned at the first station of the apparatus. The displacement of block 51 will cause moveable abutment member 53 of the fixture to be displaced apart from fixed abutment member 47 of the fixture against the biasing action of coil spring 59 of the fixture. A canister of the type shown in FIG. 5 then may be loaded onto the fixture and seated on support surface 54. The canister may be loaded onto the fixture either manually or mechanically such as with the use of a pick-and-place type of robot which also may be operated by the controller or otherwise coordinated with the operation of the apparatus. Upon placement of the canister in the fixture between the fixed and moveable abutment members, the controller will function to operate the control valve for cylinder member 68 to remove fluid under pressure from the base end thereof and allow the moveable abutment member of the fixture to displace towards the fixed abutment member under the action of coil spring 59 to firmly clamp the canister in position with the centerline thereof disposed at an angle of 39.5°.

Once the canister is firmly retained on the fixture positioned at the first work station, the controller functions to operate the indexing mechanism to rotate platform 32 to advance and position the fixture at the second work station. Sensing the fixture being positioned at the second work station, the controller functions to operate a suitable valve to supply fluid under pressure to the base end of cylinder member 123 of wedging assembly 36 to extend the rod member thereof and cause wedge member 126 to engage cam surface 52 of block member 51 of the fixture. The camming action of the wedge member functions to enhance the clamping action of the moveable abutment member of the fixture thereby enhancing the retention of the canister in the fixture for the piercing operation to follow.

Sequentially, the controller functions to operate a certain valve to supply fluid under pressure to the base end of cylinder member 86 of the hole piercing assembly causing rod member 88 to displace downwardly and correspondingly cause piercing tool 93 to form an opening 100 in a rounded shoulder portion 21 of the canister supported on the fixture. The stroke of rod member 88 is designed to cause the piercing tool to pierce the canister wall in the manner as shown in FIG. 6a to provide an opening 100 with a converging side wall adapted to receive and nest a spherical fusible body 101 as shown in FIG. 6c. Upon formation of the opening in the canister wall, the controller functions to operate suitable valves to retract rod member 88 of assembly 36 and rod member 124 of wedging assembly 36 to free the fixture holding the pierced container.

The disengagement of the hole forming and wedging assemblies at the second work station functions to operate the indexing mechanism to again rotate platform 32 90° to advance and next position the fixture at the third work station. Upon sensing the fixture positioned at the third work station, the controller functions to sequentially operate a valve to remove the supply of fluid under pressure to passageway 163 and lower gas chamber 155 of the welding head assembly thus permitting piston member 151 to be displaced downwardly under the action of coil spring 161 into engagement with the rounded shoulder portion of the canister disposed therebelow, and then operate a second valve to supply the gas to be charged into of the canister to passageway 142 and simultaneously through elongated bore 162 of the piston member to charge the canister through gas filling opening 100, and chamber 154 to provide an additional force on the piston member which functions to enhance the sealing engagement of the rod portion of the piston member with the canister. The canister is first supplied with gas at a selected high pressure to test the structural integrity of the canister. If no structural defect is detected, the pressure of the gas is reduced to a selected lower pressure at which the canister is to be pressurized. If a structural failure is detected, suitable controls will be operated to discontinue the gas supply and allow removal of the defective canister at a selected location in the cycle. Assuming the canister is tested positively, a mechanism within assembly 38 then operates to dispense a spherical fusible ball through passageway 143 and elongated bore 162 to opening 100, as shown in FIG. 6c, as the charging gas continues to be supplied to the canister. With the fusible body thus nested in the gas filling opening of the canister and the charging gas pressure being maintained, the controller functions to operate suitable valves to supply air under pressure to the base ends of cylinder members 186 and 192 to extend the rod members thereof and cause electrodes 189 and 195 to engage the canister in firm mechanical and electrical contact. The welding rod assembly is then operated to extend welding rod 176 downwardly through elongated bore 162 of the piston member to engage the fusible body, as shown in FIG. 16, while continuing to supply the charging gas to the welding head assembly. Upon engagement of the welding rod with the fusible body, the controller functions to close suitable contacts in the secondary circuit of the welding transformer to supply a low voltage, high amperage current of a suitable magnitude and for a duration of time sufficient to fuse the fusible body, causing it to close and seal the gas filling opening in the canister as shown in FIG. 6d. The controlled downward stroke of the weld rod assembly and the yielding effect provided by the spring disposed in housing 171 permits the lower end of the welding rod to provide a suitable mechanical and electrical contact with the fusible ball member with an appropriate amount of pressure to form the desired closure and seal in the gas filling opening in the canister.

The stroke of piercing tool 93 and the configuration of end portion 96 thereof provides a configuration of gas filling hole 100 which facilitates the positioning of a fusible ball therein as shown in FIG. 6c, positive engagement of the lower end of the welding rod with the fusible ball, in good mechanical and electrical contact therewith, the desired flow of molten ball material to sufficiently close the opening and suitable heat transfer for solidifying the molten material into a structurally integral, fluid tight closure. The converging profile of the hole provides a large enough opening to inject gas into the canister yet small enough to receive and nest a fusible ball at the upper end thereof as shown in FIGS. 6b and 6c. The volume of the ball is sized so that upon fusing the ball, the molten material will sufficiently fill the hole space as shown in FIG. 6d.

Upon the passage of a suitable interval of time, allowing the closure to solidify and properly seal the opening, the controller functions to sequentially retract the welding rod assembly, retract electrodes 189 and 195, discontinue the supply of charging gas to passageway 142 and then supply gas under pressure to passageway 163 and correspondingly lower gas chamber 155 of the welding head assembly to cause piston member 151 to retract out of engagement with the canister, against the biasing action of coil spring 161. The wedging member located at the third work station and operatively engageable with the fixture for enhancing the retention of the canister during the gas charging and sealing operation is then disengaged to free the fixture for advancement to the next work station.

The defective closure detection device then functions to determine whether the closure and seal of the gas filling opening of the canister is satisfactory or unsatisfactory. If a satisfactory condition is sensed, the controller will function to operate the indexing mechanism to advance the fixture past the fourth work station to the first work station where the release assembly is again actuated to permit the unloading of the satisfactorily pressurized and sealed canister and the loading of a new canister to be cycled as described. If an unsatisfactory closure and seal is sensed, the controller will function to advance the fixture to the fourth station and actuate the removal assembly to drill a relief hole in the side wall of the canister, allowing the residual gas in the canister to be released. Upon release of the gas from the canister and the removal of the canister from the fixture, the indexing mechanism is operated to advance the fixture to the first station where another canister to be charged may be mounted on the fixture to start another cycle.

In the procedure as described, when the canister with the pierced gas filling hole is positioned at the third work station to be charged and sealed, the structual integrity of the canister may be tested by first applying the charging gas under an elevated pressure in the range of 8,500 to 10,500 psi and then if the canister is determined to be structurally sound, the charging gas pressure may be reduced to an operating pressure of the gas in the canister in the range of 3,000 to 5,400 psi.

In circumstances where the piercing of the, canister at the second work station may result in undue stress concentrations in the wall portion of the canister in the vicinity of the pierced opening, possibly resulting in subsequent structural failure of the canister, such an occurrence may be avoided by utilizing a drilling operation instead of a punching operation at the second work station. In essence, a drilling assembly comparable to assembly 39 would be substituted for the hole punching assembly 37 at the second work station. Alternatively, the work stations may be arranged to provide a first loading and unloading station, a second work station provided with a drill assembly which operates to selectively form a partial or complete drilling of a wall portion of the canister, a third station provided with a puncturing assembly for punching a hole completely through a partially drilled hole and a fourth station provided with a gas charging and sealing assembly of the type described. In such an arrangement, the canister would be loaded at the first station, a hole would be partially drilled at the second station, the partially drilled hole would be completely punched through the canister wall at the third station, the canister would be charged through the partially drilled and completely punched through hole and then sealed at the fourth work station and the canister would then be returned to the first work station. If such canister was detected as having a satisfactory seal, it then would be unloaded at the first station and a new canister would be loaded onto the fixture to be cycled as described. If an unsatisfactory canister was detected, the controller would operate to advance the fixture with the defective canister to a suitable station provided with an assembly comparable to assembly 39 to drill a relief hole to discharge the gas from the canister and then dispose of the depleted canister.

Figure 20:
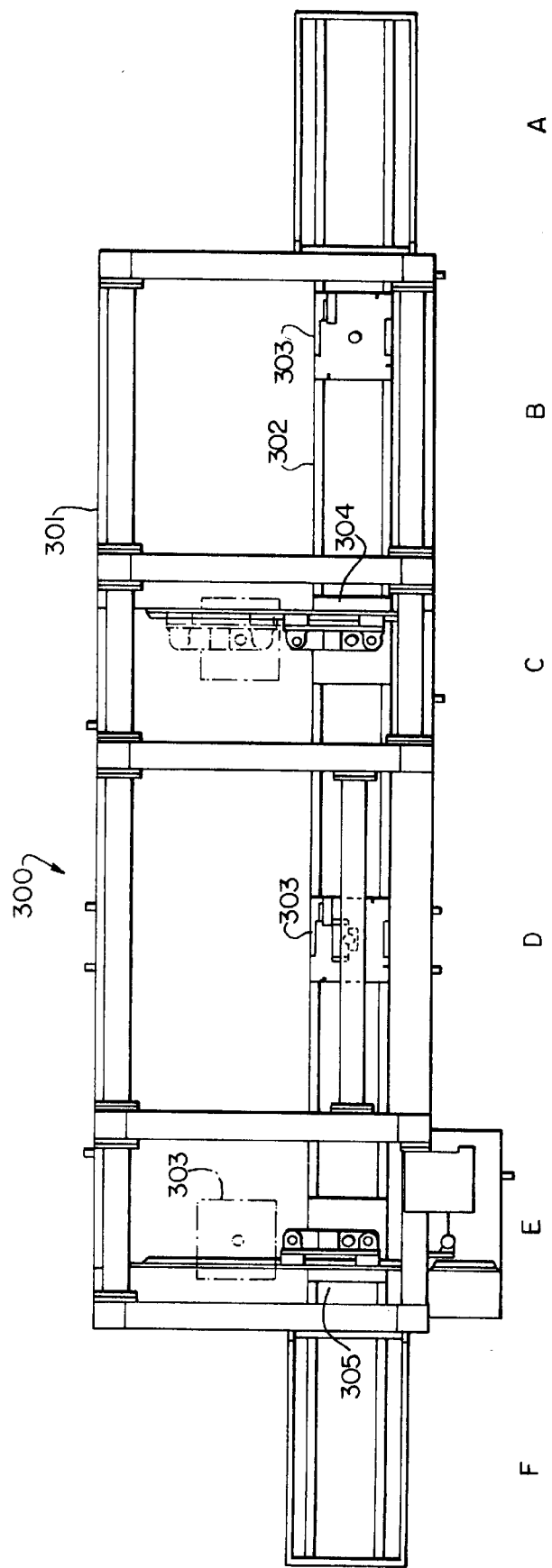
FIG. 20 is a top plan view of another embodiment of the invention.

FIG. 20 illustrates another embodiment of the invention in which canisters are advanced along a linear line of travel to a number of work stations at which various work functions are performed. The embodiment consists of an apparatus 300 including a main support frame 301, a conveyor 302 mounted on the support frame, a plurality of pallets 303 spaced along the conveyor and means for operating the conveyor to advance the pallets intermittently along the line of work stations. Each of the pallets is provided with a fixture similar or comparable to fixture 34 described in connection with the embodiment shown in FIGS. 1 through 4 for releasibly retaining a canister in a selected orientation to be pierced, filled with a gas under pressure and sealed as in the previously described embodiments.

Referring to FIG. 20, the apparatus will be seen to provide a canister loading station A, a piercing station B, a pre-weighing station C, a gas charging and sealing station D, a post-weighing and defective weld processing station E and an unloading station F. Mounted on main frame 301 at station B is a hole piercing assembly comparable to the hole piercing assembly shown in FIGS. 9 and 9a. Such assembly is positioned on the main frame relative to conveyor 302 so that when a pallet carrying a canister disposed in a selected orientation, is positioned at station B, the piercing tool of the assembly will be vertically aligned with the portion of the canister to be punctured. Mounted on main frame 301 at station C is a transfer mechanism 304 which is adapted to laterally displace a pallet 301 positioned at station C, weigh the empty pierced canister and transfer it laterally back onto the conveyor for advancement to station D. A gas charging and hole sealing assembly comparable to the assembly shown in FIGS. 12 through 18 is mounted on main frame 301 at station D which functions to charge a canister supported on a pallet positioned at station D with a gas under pressure, and seal the gas filling hole in the canister in the manner as previously described.

Disposed between stations D and E or at station E is a means for detecting a defective closure weld as in the previously described embodiment. Also mounted on the main frame at station E is a mechanism for post weighing a filled and sealed canister positioned at station E, and a defective weld processing assembly comparable to the assembly shown in FIG. 19. Upon detection of a defective closure weld or an underweight or overweight canister positioned at station E, the defective weld processing assembly will be operated to drill a relief hole in the canister and allow the release of gas from the canister. The pallets supporting canisters at station E are then transferred laterally by a mechanism 305 from where they are advanced to station F for unloading.

Preferably, conveyor 302 is an endless conveyer on which pallets 301 are spaced apart the distances between successive stations on the apparatus. Canisters loaded onto fixtures supported on pallets at station A are incrementally advanced by the conveyor sequentially to station B where the gas filling hole is formed, station C where the canister its pre-weighed, station D where the canister is charged with a gas under pressure and the gas filling hole in the canister is sealed with a weld closure, station E where the canister is post-weighed and the closure weld of any defective canister is removed and station F where the canister is removed either to undergo further processing or to be recycled.

Although the canister has been described as being oriented at an angle of 39.5° relative to the horizontal, and the gas filling hole position has been described as being located at a rounded shoulder portion of the canister, in connection with the embodiment shown in FIGS. 1 through 19, it is contemplated that the canister can be oriented in any position and the gas filling hole may be located at any area of the canister including the end portions, the rounded shoulder portions or the cylindrical main body portion thereof. It further is contemplated within the scope of the present invention that the embodiment described in connection with FIG. 20 may include means disposed at station B for forming the gas filling opening in the canister by drilling or partially drilling and puncturing as described in the modification of the embodiment shown in FIGS. 1 through 19.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A method of charging a closed metallic canister with a gas under pressure comprising;

forming an opening in a wall portion of said canister;

positioning a dispensing member with a passageway therein communicating with said canister opening and a contact surface. thereof disposed about the periphery of said passageway engaging a contact surface of said canister disposed about the periphery of said canister opening;

applying a first biasing force provided by a gas under pressure, in a first direction, to urge said contact surfaces into sealing engagement;

injecting a gas under pressure through said passageway and canister opening into said canister while continuing to apply said first biasing force to maintain said contact surfaces in said sealing engagement;

transferring a fusible body through said passageway of said dispensing member into said canister opening while continuing to apply said first biasing force to maintain said contact surfaces in said sealing engagement;

extending a welding rod through said passageway into contact with said fusible body disposed in said canister opening and fusing said body to close said canister opening while continuing to apply said first biasing force to maintain said contact surfaces in said sealing engagement;

retracting said welding rod through said passageway out engagement with said fuse body; and applying a second biasing force on said dispensing means in a direction opposite to said first direction to retract said dispensing member and separate said contact surfaces out of sealing engagement.

2. A method according to claim 1 wherein said opening is formed by penetrating said wall portion with a piercing tool.

3. A method according to claim 1 wherein said opening is formed with a side wall configuration for cradling a fusible body deposited therein.

4. A method according to claim 1 wherein said opening is formed with an annular divergent side wall for receiving and retaining a fusible body deposited therein.

5. A method according to claim 1 including applying a biasing force in said first direction prior to said first biasing force to provide an initial sealing engagement of said contact surfaces.

6. A method according to claim 1 including simultaneously applying said gas under pressure to said dispensing member to provide said first biasing force, and injecting said gas under pressure through said passageway.

7. A method according to claim 1 including applying said gas under pressure to said dispensing member to provide said second biasing force.

8. A method according to claim 5 wherein said prior biasing force is provided by a pre-loaded mechanical spring.

9. A method according to claim 1 wherein said gas is pressurized at a pressure in the range of 3,000 to 10,500 psi.

10. A method according to claim 1 wherein said fusible body is fused by resistance welding.

11. A method according to claim 1 including detecting closed canister openings for defective welds.

12. A method according to claim 11, including forming a relief opening for releasing gas previously injected into a canister having been detected to have a defective weld.

13. A method of charging a closed metallic canister with a gas under pressure comprising:

forming a gas filling opening in a wall portion of said canister;

positioning a dispensing member having a passageway therethrough relative to said canister with the passageway of said dispensing member communicating with said gas filling opening of said canister and a portion of said dispensing member disposed about the periphery of said passageway therein engaging a portion of said canister about the periphery of said gas filing opening;

supplying a gas under pressure through said passageway of said dispensing member and said filling hole to charge said canister, and against a surface of said dispensing member to urge said dispensing member into sealing engagement with said canister;

dispensing a fusible body through said passageway of said dispensing member into said gas filling opening in said canister while continuing to supply gas under pressure to said passageway of said dispensing member and against said dispensing member;

extending a welding rod through said passageway of said dispensing member into engagement with said fusible body nested in said gas filling opening of said canister to fuse said body and cause it to form a closure in said gas filing opening of said canister, while continuing to supply said gas under pressure through said passageway in said dispensing means and against said dispensing means to maintain said dispensing means in sealing engagement with said canister;

allowing said fused body closing said gas filling opening in said canister to solidify and seal the pressurized cylinder;

retracting said welding rod;

discontinuing the supply of gas under pressure to said passageway of said dispensing member and against said dispensing member; and retracting said dispensing means from said canister.

14. A method according to claim 13 wherein said gas is supplied at a pressure in the range of 3,000 to 10,500 psi.

* * * * *